(12) United States Patent
Lee

(10) Patent No.: US 11,352,280 B2
(45) Date of Patent: Jun. 7, 2022

(54) RAINWATER FILTERING DEVICE AND MONITORING SYSTEM THEREFOR

(71) Applicant: LANDROAD INC, Jeonju-si (KR)

(72) Inventor: Ju Seung Lee, Jeonju-si (KR)

(73) Assignee: LANDROAD INC, Jeonju-si (KR)

( * ) Notice: Subject to any disclaimer, the term of this patent is extended or adjusted under 35 U.S.C. 154(b) by 0 days.

(21) Appl. No.: 17/260,599

(22) PCT Filed: Dec. 6, 2018

(86) PCT No.: PCT/KR2018/015365
§ 371 (c)(1),
(2) Date: Jan. 15, 2021

(87) PCT Pub. No.: WO2020/022586
PCT Pub. Date: Jan. 30, 2020

(65) Prior Publication Data
US 2021/0269342 A1  Sep. 2, 2021

(30) Foreign Application Priority Data

Jul. 26, 2018  (KR) .......................... 10-2018-0087211

(51) Int. Cl.
*C02F 3/34* (2006.01)
*C02F 1/00* (2006.01)
(Continued)

(52) U.S. Cl.
CPC .............. *C02F 3/348* (2013.01); *C02F 1/001* (2013.01); *E03F 5/14* (2013.01);
(Continued)

(58) Field of Classification Search
CPC .... C02F 3/348; C02F 1/001; C02F 2103/001; C02F 2203/006; E03F 5/14;
(Continued)

(56) References Cited

U.S. PATENT DOCUMENTS 3,282,430 A * 11/1966 Kinne .................... E02B 13/00
210/162
5,849,198 A * 12/1998 Sharpless ................ C02F 1/285
210/693
(Continued)

FOREIGN PATENT DOCUMENTS

CN        105923938 A  *  9/2016  ................ C02F 9/00
CN        206160360 U  *  5/2017  ............. B01D 46/00
(Continued)

OTHER PUBLICATIONS

Lee Ju Seung, KR20170000981A Filtering Device for Rainfall Runoff and Monitoring System Thereof, Espacenet translation, publication: Jan. 2017 (Year: 2017).*
(Continued)

*Primary Examiner* — Claire A Norris
*Assistant Examiner* — Ekandra S. Miller-Cruz
(74) *Attorney, Agent, or Firm* — Lex IP Meister, PLLC

(57) ABSTRACT

There are provided a rainwater filtering device and a monitoring system therefor. The rainwater filtering device includes: a filtering unit including a strainer therein; a first overflow preventing unit supported by a compression rod and installed above the filtering unit; a pre-treating unit installed in front of an inlet of the filtering unit in order to pre-treat rainwater introduced into the filtering unit; and a second overflow preventing unit supported by a compression rod and installed above the pre-treating unit.

11 Claims, 12 Drawing Sheets

(51) Int. Cl.
*E03F 5/14* (2006.01)
*C02F 103/00* (2006.01)

(52) U.S. Cl.
CPC .. *C02F 2103/001* (2013.01); *C02F 2203/006* (2013.01); *E03F 2201/20* (2013.01)

(58) Field of Classification Search
CPC .... E03F 2201/20; E03F 5/0401; B01D 35/02; B01D 29/356; B01D 2201/605; B01D 35/28; B01D 2221/12; G06Q 50/02; G06Q 50/10
USPC ......................................................... 210/163
See application file for complete search history.

(56) References Cited

U.S. PATENT DOCUMENTS

| | | | | |
|---|---|---|---|---|
| 6,009,823 A * | 1/2000 | Gross | ................... | B63B 13/02 |
| | | | | 114/198 |
| 6,811,708 B2 * | 11/2004 | Shaw | ................... | E03F 5/0404 |
| | | | | 210/162 |
| 2003/0047497 A1 * | 3/2003 | Harris | ................... | E03F 1/00 |
| | | | | 210/163 |
| 2010/0038300 A1 * | 2/2010 | Allan | ................... | E03F 1/002 |
| | | | | 210/248 |
| 2012/0222998 A1 * | 9/2012 | Pierzchalski | ............ | C02F 1/001 |
| | | | | 210/170.03 |
| 2015/0246836 A1 * | 9/2015 | Shin | ................... | C02F 3/348 |
| | | | | 435/252.5 |
| 2017/0284077 A1 * | 10/2017 | Deurloo | ................... | B01D 29/96 |
| 2018/0016792 A1 * | 1/2018 | Valdez | ................... | E04D 13/08 |

FOREIGN PATENT DOCUMENTS

| | | | | |
|---|---|---|---|---|
| CN | 107524223 | | 12/2017 | |
| CN | 207484645 | | 6/2018 | |
| JP | 2014066044 | | 4/2014 | |
| KR | 100662520 | | 1/2007 | |
| KR | 1020080000288 | | 1/2008 | |
| KR | 1020090107245 | | 10/2009 | |
| KR | 101005589 | | 1/2011 | |
| KR | 101147866 B1 * | 5/2012 | ............ E03F 5/0404 |
| KR | 101239227 | | 3/2013 | |
| KR | 20150045187 | | 4/2015 | |
| KR | 20160101474 A * | 8/2016 | ............ A01K 61/00 |
| KR | 10-2017-0000981 | | 1/2017 | |
| KR | 101794124 B1 * | 11/2017 | ............ B01D 35/02 |
| KR | 10-1881848 | | 7/2018 | |

OTHER PUBLICATIONS

KIPO, PCT Search Report of PCT/KR2018/015365 dated Apr. 8, 2019.

KIPO, Notice of Allowance of KR 10-2018-0087211 dated Feb. 28, 2019.

SIPO, Office Action of CN 201880003909.9 dated Jul. 27, 2020.

* cited by examiner

RAINWATER FILTERING DEVICE AND MONITORING SYSTEM THEREFOR

TECHNICAL FIELD

The present invention relates to a rainwater filtering device, and a monitoring system therefor.

BACKGROUND ART

In general, pollutants may be classified into a point pollution source having a clear discharge point and a non-point pollution source having an unclear discharge point. The point pollution source may be discharged in a state in which it is purified to some extent because a separate purification device or a wastewater treatment facility is installed at the discharge point. On the other hand, the non-point pollution source material may have the unclear discharge point and remain on a wide range of ground surface, and be then introduced into water systems such as streams and rivers together with rainwater to cause water pollution.

Examples of the non-point pollution source include agricultural lands, pastures, urban streets, forest lands, and suburb areas, and potential non-point pollutants existing mainly on a surface of soil or near the ground surface are washed away by the rainwater and are included in a runoff to be introduced into the water system. The non-point pollutants, which are pollutants mainly discharged together with a ground surface runoff when it rains, refer to fertilizers and pesticides sprayed on the agricultural lands, soil erosion products, livestock house effluents, traffic pollutants, dust and garbage in urban areas, residues of living organisms, air pollutants that have fallen to the ground surface, and the like.

In order to prevent such water pollution, a non-point pollutant processing device for preventing the non-point pollutants from being introduced into the water systems such as streams and rivers together with initial water storm has been provided. Such a non-point pollutant processing device blocks introduction of the non-point pollutants by installing a screen in a passage through which the non-point pollutants are introduced along with the rainwater into the water system.

However, the non-point pollutant processing device may be installed on a concrete waterway, a road slope or the like, and it is thus difficult to install the non-point pollutant processing device. In addition, earthy materials introduced into the concrete waterway, the road slope or the like, residues of traffic accidents or the like, and foreign materials other than the rainwater may be introduced into the non-point pollutant processing device to damage the non-point pollutant processing device or cause deterioration of a filtering function.

RELATED ART DOCUMENT

Patent Document (Patent Document 1) Korean Patent No. 0718719 (registered on May 9, 2007)
(Patent Document 2) Korean Patent Laid-Open Publication No. 2015-0045187 (published on Apr. 28, 2015)

DISCLOSURE

Technical Problem

The present invention has been made in an effort to solve the problem described above, and provides a rainwater filtering device capable of being easily installed in and simply removed from a drainage way, a slope or the like of a road.

Further, the present invention provides a monitoring system of a rainwater filtering device including a control device capable of receiving information from the rainwater filtering device and warning a manager whether or not the rainwater filtering device needs to be cleaned, whether or not a strainer needs to be replaced, or the like.

Objects of the present invention are not limited to the objects mentioned above, and other objects that are not mentioned may be obviously understood by those skilled in the art from the following description.

Technical Solution

According to an aspect of the present invention, a rainwater filtering device includes: a filtering unit including a strainer therein; a first overflow preventing unit supported by a compression rod and installed above the filtering unit; a pre-treating unit installed in front of an inlet of the filtering unit in order to pre-treat rainwater introduced into the filtering unit; and a second overflow preventing unit supported by a compression rod and installed above the pre-treating unit.

In addition, the filtering unit may include: a connection ring hooked onto a compression rod to support one end of the filtering unit; a fastening member connected to the compression rod supporting the first overflow preventing unit to support the other end of the filtering unit; and a guide fixing plate including a lower fixing plate and a pair of side fixing plates installed at the inlet of the filtering unit to fix the strainer.

In addition, a weight sensor may be installed on the compression rod to which the fastening member is connected.

In addition, the lower fixing plate may be in close contact with a bottom of a waterway, and may include a double groove whose thicknesses are different from each other so that one end of the strainer is overturned and inserted, so as to correspond to a thickness of the strainer.

In addition, the pair of side fixing plates may be in close contact with a vertical preventing plate of the first overflow preventing unit.

In addition, the pre-treating unit may include: an upper opening; a connection ring hooked onto a compression rod to support one end of the pre-treating unit; and a connection member connected to the compression rod to support the other end of the pre-treating unit; and an inclined plate inclined and attached to an upper portion and located behind the upper opening.

In addition, a weight sensor may be installed on the compression rod to which the connection member is connected.

In addition, the rainwater filtering device may further include a screen supported by a compression rod and installed in an inclined state in front of at least one of the filtering unit or the pre-treating unit.

In addition, the rainwater filtering device may further include an EM supply unit installed above the inlet of the filtering unit and drops an EM capsule or an EM ball having effective microorganisms (EM) toward the inlet of the filtering unit.

In addition, the rainwater filtering device may further include a sensor unit including a rainwater amount sensor measuring an amount of rainwater introduced into the filtering unit, a weight sensor measuring a weight of the strainer, a water level sensor measuring a water level of the filtering unit, and a temperature and humidity sensor measuring a temperature and a humidity around the filtering unit.

In addition, the rainwater filtering device may further include a communication unit transmitting rainwater amount information, weight information, water level information, temperature information, and humidity information measured by the sensor unit to the outside.

According to another aspect of the present invention, a monitoring system of a rainwater filtering device includes: the rainwater filtering device including: a filtering unit including a strainer therein; a first overflow preventing unit supported by a compression rod and installed above the filtering unit; a pre-treating unit installed in front of an inlet of the filtering unit in order to pre-treat rainwater introduced into the filtering unit; a second overflow preventing unit supported by a compression rod and installed above the pre-treating unit; a sensor unit including a rainwater amount sensor measuring an amount of rainwater introduced into the filtering unit, a weight sensor measuring a weight of the strainer, a water level sensor measuring a water level of the filtering unit, and a temperature and humidity sensor measuring a temperature and a humidity around the filtering unit; and a communication unit transmitting rainwater amount information, weight information, water level information, temperature information, and humidity information measured by the sensor unit to the outside; and a remote control device determining whether or not to clean the strainer or whether or not to replace the strainer on the basis of the rainwater amount information, the weight information, the water level information, the temperature information, and the humidity information transmitted from the communication unit of the rainwater filtering device.

Detailed contents of other exemplary embodiments of the present invention are described in a detailed description and are illustrated in the accompanying drawings.

Advantageous Effects

According to the present invention, the rainwater filtering device may be easily installed in and removed from a drainage way, a slope or the like of a road.

In addition, pollutants may be easily removed from the rainwater filtering device, and the rainwater filtering device may thus be easily managed.

Further, information on whether or not to clean the rainwater filtering device or whether or not to replace a strainer may be recognized, and the rainwater filtering device may thus be efficiently managed.

BEST MODE FOR INVENTION

Figure 1:
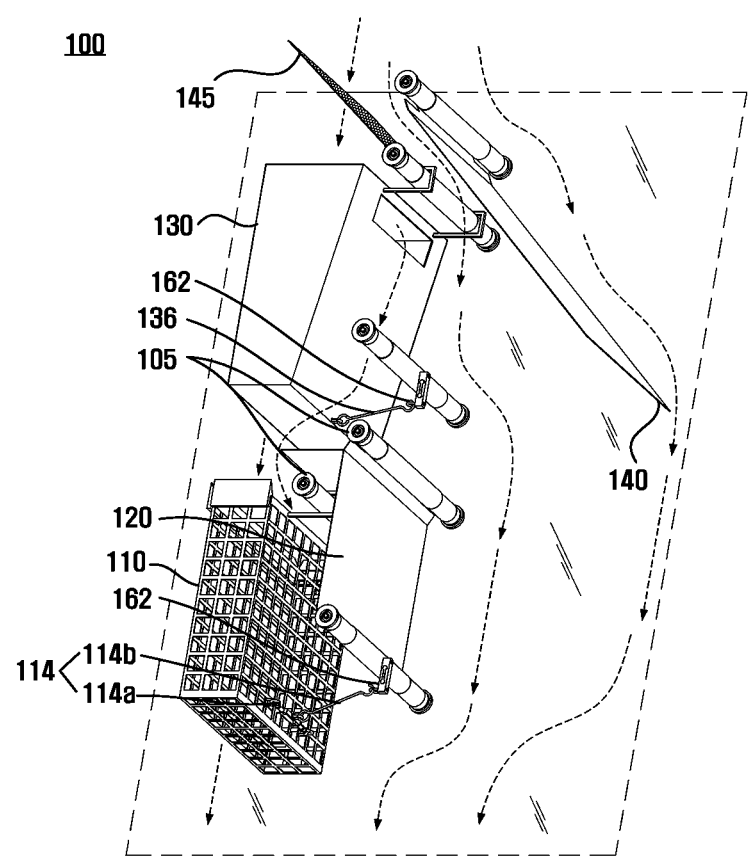
FIG. 1 is a view illustrating a rainwater filtering device according to an exemplary embodiment of the present invention.

Hereinafter, exemplary embodiments of the present invention will be described in detail with reference to the accompanying drawings. Various advantages and features of the present invention and methods accomplishing them will become apparent from the following detailed description of exemplary embodiments with reference to the accompanying drawings. However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims. Throughout the specification, like reference numerals denote like elements.

Terms "first", "second" and the like are used to describe various elements, components, and/or sections, but these elements, components, and/or sections are not limited by these terms. These terms are used only in order to distinguish one element, component, or section from another element, component or section. Therefore, a first element, a first component, or a first section mentioned below may be a second element, a second component, or a second section within the technical spirit of the present invention.

Terms used in the present specification are for describing exemplary embodiments rather than limiting the present invention. In the present specification, a singular form includes a plural form unless explicitly stated otherwise. Components, steps, operations, and/or elements mentioned by the terms "comprise" and/or "made of" used in the present specification do not exclude the existence or addition of one or more other components, steps, operations, and/or elements.

Unless defined otherwise, all terms (including technical and scientific terms) used in the present specification have the same meaning as meanings commonly understood by those skilled in the art to which the present invention pertains. In addition, terms defined in generally used dictionaries are not ideally or excessively interpreted unless they are specifically defined clearly.

Hereinafter, the present disclosure will be described in detail with reference to the accompanying drawings.

FIG. 1 is a view illustrating a rainwater filtering device according to an exemplary embodiment of the present invention.

Referring to FIG. 1, the rainwater filtering device according to an exemplary embodiment of the present invention includes a filtering unit 110 including a strainer (not illustrated) therein, a first overflow preventing unit 120 supported by a compression rod 105 and installed above the filtering unit 110, a pre-treating unit 130 installed in front of an inlet of the filtering unit 110 in order to pre-treat rainwater introduced into the filtering unit 110, and a second overflow preventing unit 140 supported by a compression rod 105 and installed above the pre-treating unit 130.

Here, the compression rod 105 may have several shapes, but may be a circular compression rod 105 in order to minimize friction of a contact point. In addition, the first overflow preventing unit 120 and the second overflow preventing unit 140 are supported by at least one compression rod 105 to be variably installed so as to correspond to a construction error of a concrete waterway. Therefore, it is easy to install the overflow preventing units 120 and 140, and it is possible to effectively prevent the rainwater from overflowing. In addition, the overflow preventing units 120 and 140 may be easily replaced and/or removed using the compression rods 105.

As illustrated in FIG. 1, rainwater passing through the rainwater filtering device 100 may largely flow in three directions. In a front end, the rainwater may be rainwater passing through the pre-treating unit 130, rainwater passing between the pre-treating unit 130 and the second overflow preventing unit 140, and rainwater flowing beyond the second overflow preventing unit 140, by the pre-treating unit 130 and the second overflow preventing unit 140. In addition, at a rear end, the rainwater may be rainwater passing through the filtering unit 110 and rainwater flowing beyond the first overflow preventing unit 120. In this case, the first overflow preventing unit 120 may include a plate formed vertically to allow rainwater whose capacity may be treated to be introduced into the filtering unit 110 and allow the remaining rainwater to flow beyond the first overflow preventing unit 120.

Hereinafter, the rainwater filtering device 100 according to an exemplary embodiment of the present invention will be described in detail.

Figure 2:
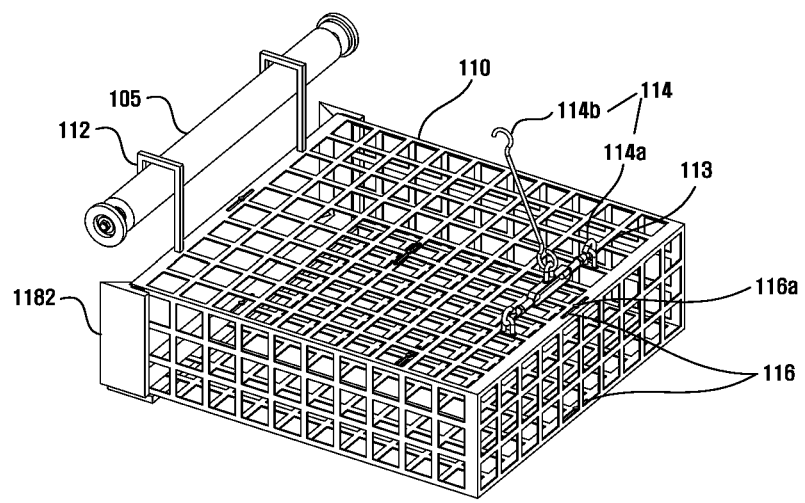
FIG. 2 is a view illustrating a filtering unit in the rainwater filtering device of FIG. 1.
Figure 3:
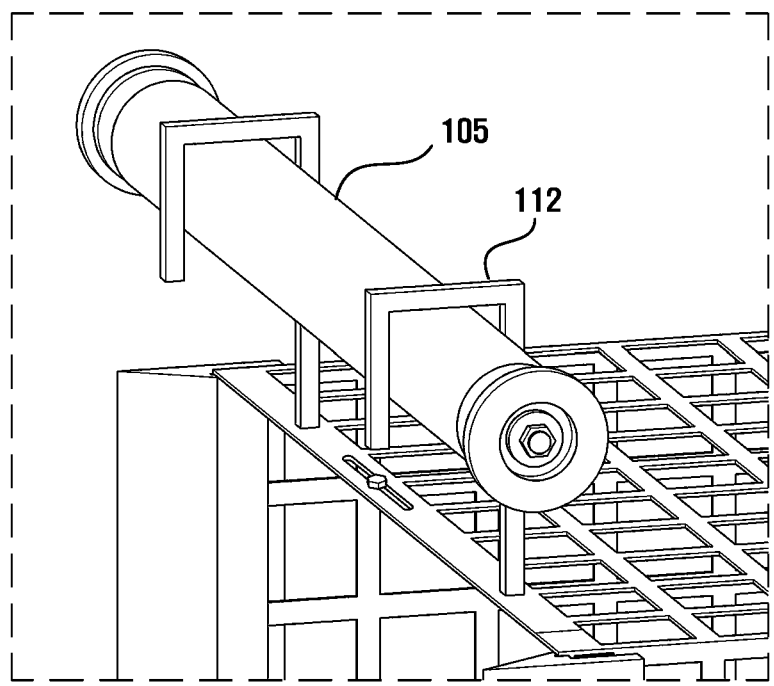
FIG. 3 is a view illustrating a connection relationship between a compression rod and one side of the filtering unit in the rainwater filtering device of FIG. 1.
Figure 4:
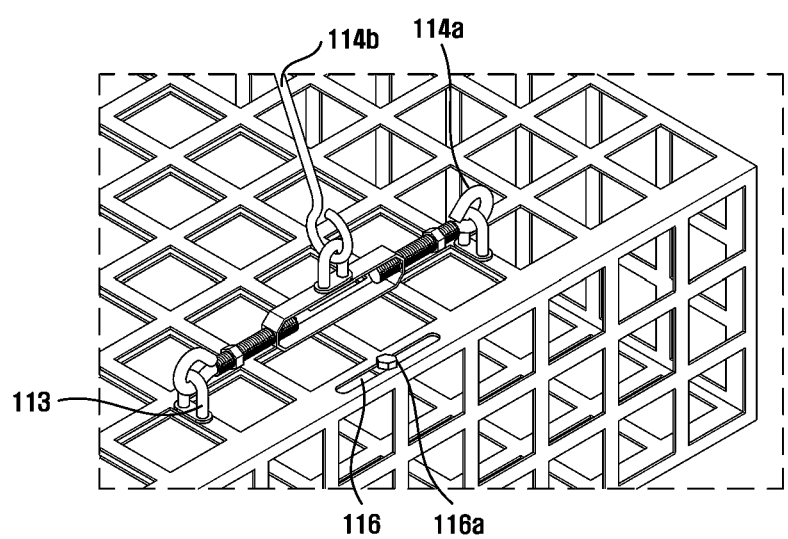
FIG. 4 is a view illustrating a connection relationship between a first overflow preventing unit and the other side of the filtering unit in the rainwater filtering device of FIG. 1.
Figure 5:
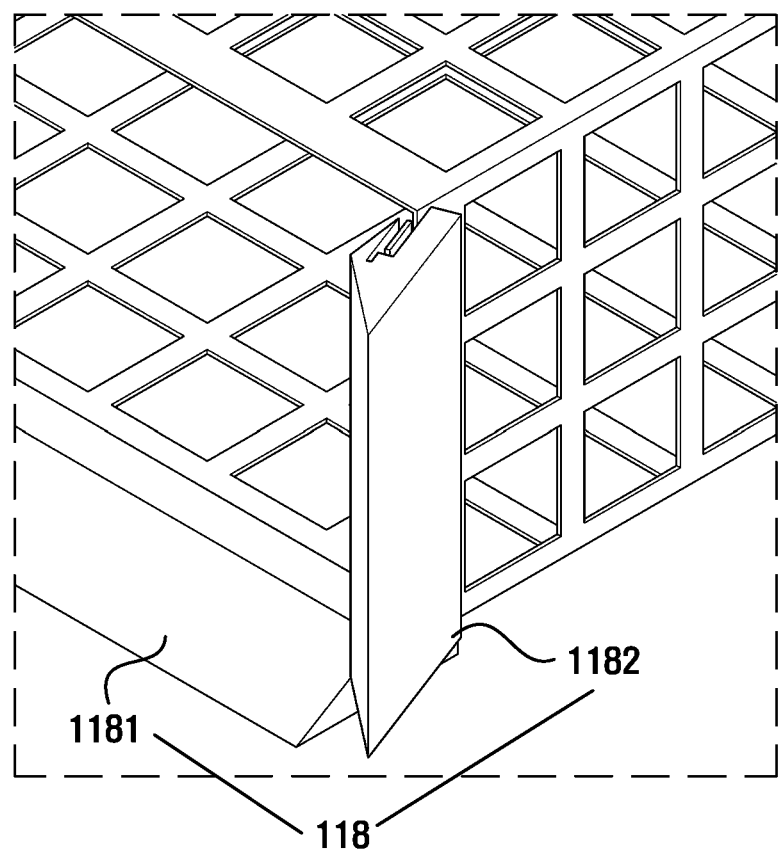
FIG. 5 is a view illustrating a guide fixing plate of the filtering unit in the rainwater filtering device of FIG. 1.

FIG. 2 is a view illustrating a filtering unit in the rainwater filtering device of FIG. 1. In addition, FIG. 3 is a view illustrating a connection relationship between a compression rod and one side of the filtering unit in the rainwater filtering device of FIG. 1. In addition, FIG. 4 is a view illustrating a connection relationship between a first overflow preventing unit and the other side of the filtering unit in the rainwater filtering device of FIG. 1. Further, FIG. 5A is a view illustrating a guide fixing plate of the filtering unit in the rainwater filtering device of FIG. 1, and FIG. 5B is a lower fixing plate of the guide fixing plate.

The filtering unit 110 may filter pollutants included in the rainwater by passing the rainwater therethough. The rainwater passing through the strainer through the filtering unit 110 may be filtered and discharged.

Referring to FIGS. 1 to 5B, the filtering unit 110 may include connection rings 112 hooked onto the compression rod 105 to support one end of the filtering unit 110, a fastening member 114 connected to the compression rod 105 supporting the first overflow preventing unit 120 to support the other end of the filtering unit 110, and a guide fixing plate 118 including a lower fixing plate 1181 and a pair of side fixing plates 1182 installed at the inlet of the filtering unit 110 to fix the strainer. In addition, the filtering unit 110 may include a plurality of linear grooves 116.

The connection rings 112 of the filtering unit 110 are hooked onto the compression rod 105 to support the filtering unit 110. The connection rings 112 may be hooked onto a circular compression rod 105 to support the filtering unit 110, thereby supporting the filtering unit 110 while minimizing friction of a contact point, and minimizing a resistance that may affect measurement of a weight sensor 162 installed in front of the connection ring 112.

The fastening member 114 is connected to the compression rod 105 supporting the first overflow preventing unit 120 to support the filtering unit 110. Such a fastening member 114 may include a both-end adjustable nut ring 114a connected to a ring 113 formed in the filtering unit 110, and a fastening ring 114b having one end connected to the compression rod 105 supporting the first overflow preventing unit 120 and the other end connected to the both-end adjustable nut ring 114a.

In this case, the weight sensor 162 may be installed on the compression rod 105 to which the fastening member 114 is connected. Specifically, the weight sensor 162 having a ring is installed on the compression rod 105, the fastening ring 114b is connected to the ring, and weights of the filtering unit 110 and the strainer included in the filtering unit 110 may be measured using the weight sensor 162.

The plurality of linear grooves 116 are formed in the filtering unit 110. These linear grooves 116 may be fastened to each other by bolts 116a. A width of the filtering unit 110 may be appropriately adjusted by appropriately overlapping the plurality of linear grooves 116 formed in the filtering unit 110 with each other and fastening the plurality of linear grooves 116 to each other by the bolts 116a. Therefore, the filtering unit 110 may be variably installed so as to correspond to a spatial width of a waterway. That is, the filtering unit 110 may be in a variable type.

Installation and removal of the filtering unit 110 may be facilitated by supporting and installing the filtering unit 110 using structures of the plurality of linear grooves 116 formed in the filtering unit 110 and the compression rod 105.

The guide fixing plate 118 fixes the strainer after the strainer is inserted into the filtering unit 110. The guide fixing plate 118 may include the lower fixing plate 1181 and the pair of side fixing plates 1182 installed at the inlet of the filtering unit 110 to fix the strainer. For example, after the strainer is inserted, a distal end of the strainer may be overturned to surround the inlet of the filtering unit 110, and the guide fixing plate 118 may be inserted to fix the strainer. In this case, a lower end of an inlet portion of the filtering unit 110 may be fixed by the lower fixing plate 1181, both side ends of the inlet portion may be fixed by the pair of side fixing plates 1182, and an upper end of the inlet portion may be fixed by a clip, Velcro, or the like.

It is preferable that the lower fixing plate 1181 is in close contact with a bottom of the waterway in order to prevent the rainwater from flowing to the outside of the filtering unit 110. In particular, the lower fixing plate 1181 may include a double groove whose thicknesses are different from each other so that one end of the strainer is overturned and inserted, so as to correspond to a thickness of the strainer. That is, as illustrated in FIG. 5B, the lower fixing plate 1181 may include a first groove 1181a and a second groove 1181b having a thickness smaller than that of the first groove 1181a. For example, a thickness of the first groove 1181a may be 3 mm, a thickness of the second groove 1181b may be 1 mm, and a non-woven fabric (3 mm when a filter is overlaid) and a woven fabric (1 mm when a filter is overlaid) may be appropriately used depending on a situation.

It is preferable that the pair of side fixing plates 1182 are in close contact with a vertical preventing plate 124 of the first overflow preventing unit 120 so that all the rainwater that has passed through the pre-treating unit 130 is introduced into the filtering unit 110.

Again referring to FIG. 1, the first overflow preventing unit 120 is supported by the compression rod 105 and is installed above the filtering unit 110. In this case, the first overflow preventing unit 120 may include the vertical preventing plate 124 formed vertically to allow rainwater whose capacity may be treated to be introduced into the filtering unit 110 and allow the remaining rainwater to flow beyond the first overflow preventing unit 120.

For example, the first overflow preventing unit 120 is supported by a pair of compression rods 105, the vertical preventing plate 124 is extended and located at an inlet side of the filtering unit 110, and it is preferable that the vertical preventing plate 124 is in close contact with the pair of side fixing plates 1182.

Figure 6:
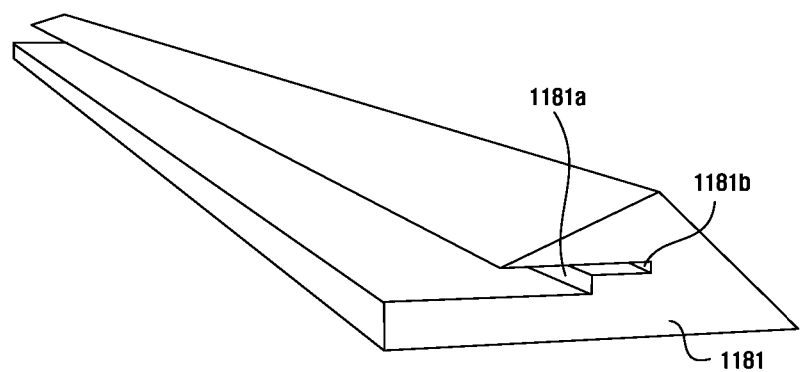
FIG. 6 is a lower fixing plate of the guide fixing plate.

FIG. 6 is a view illustrating a pre-treating unit in the rainwater filtering device of FIG. 1.

Referring to FIGS. 1 and 6, the pre-treating unit 130 pre-treats the rainwater introduced into the filtering unit. To this end, the pre-treating unit 130 is installed in front of the inlet of the filtering unit 110. The pre-treating unit 130 may include an upper opening 132, connection rings 134 hooked onto the compression rod 105 to support one end of the pre-treating unit 130, a connection member 136 connected to the compression rod to support the other end of the pre-treating unit 130, and an inclined plate 138 inclined and attached to an upper portion and located behind the upper opening 132.

The upper opening 132 is an opened portion formed at an upper end of the pre-treating unit 130, and is a portion in which the rainwater is discharged after a precipitate is precipitated from the rainwater flowing into the pre-treating unit 130.

The connection rings 134 of the pre-treating unit 130 are hooked onto the compression rod 105 to support the pre-treating unit 130. The connection rings 134 of the pre-treating unit 130 may be hooked onto a circular compression rod 105 to support the pre-treating unit 130, thereby supporting the pre-treating unit 130 while minimizing friction of a contact point, and minimizing a resistance that may affect measurement of a weight sensor (not illustrated) installed at the other end of the pre-treating unit 130.

The connection member 136 is connected to the compression rod 105 to support the pre-treating unit 130. Such a connection member 136 has one end connected to the compression rod 105 and the other end connected to a ring 137 formed in the pre-treating unit 130.

In this case, the weight sensor 162 may be installed on the compression rod 105 to which the connection member 136 is connected. Specifically, the weight sensor 162 having a ring is installed on the compression rod 105, and the connection member 136 is connected to the ring. The weight sensor 162 may be installed to measure weights of the pre-treating unit 130 and a precipitate precipitated in the pre-treating unit 130.

The inclined plate 138 is inclined and attached to an upper portion of an inner portion of the pre-treating unit 130 and is located behind the upper opening 132. The inclined plate 138 induces a vortex of the rainwater introduced into the pre-treating unit 130. The inclined plate 138 is located behind the upper opening 132 in an inclined direction opposite to the upper opening 132 so as to be capable of preventing separation of the precipitate at a low water level and forming a vortex inside the pre-treating unit 130 at a high water level.

Again referring to FIG. 1, the second overflow preventing unit 140 is supported by the compression rod 105 and is installed above the pre-treating unit 130. The second overflow preventing unit 140 is disposed to form a space between the second overflow preventing unit 140 and the pre-treating unit 130, and rainwater that cannot be introduced into the pre-treating unit 130 due to a large amount may pass through the space.

In addition, the second overflow preventing unit 140 may be installed in an inclined state, and a speed of the rainwater flowing to an upper portion of the second overflow preventing unit 140 may be decreased.

In addition, the second overflow preventing unit 140 is supported by one compression rod 105, and may be designed to rotate by a weight of the rainwater. For example, there may be rainwater introduced into only the pre-treating unit 130, rainwater introduced into two spaces of the pre-treating unit 130 and between the pre-treating unit 130 and the second overflow preventing unit 140, and rainwater flowing over the second overflow preventing unit 140 other then the rainwater introduced into two spaces of the pre-treating unit 130 and between the pre-treating unit 130 and the second overflow preventing unit 140, depending on an amount of rainwater. In a case where an amount of rainwater flowing over the second overflow preventing unit 140 exceeds a first threshold value, the second overflow preventing unit 140 installed in an inclined direction may rotate in one direction. In this case, a rotation angle of the second overflow preventing unit 140 may linearly increase depending on the amount of rainwater according to a preset criterion. In addition, in a case where the amount of rainwater flowing over the second overflow preventing unit 140 reaches a second threshold value, the second overflow preventing unit 140 may be maintained at a horizontal level.

Figure 7:
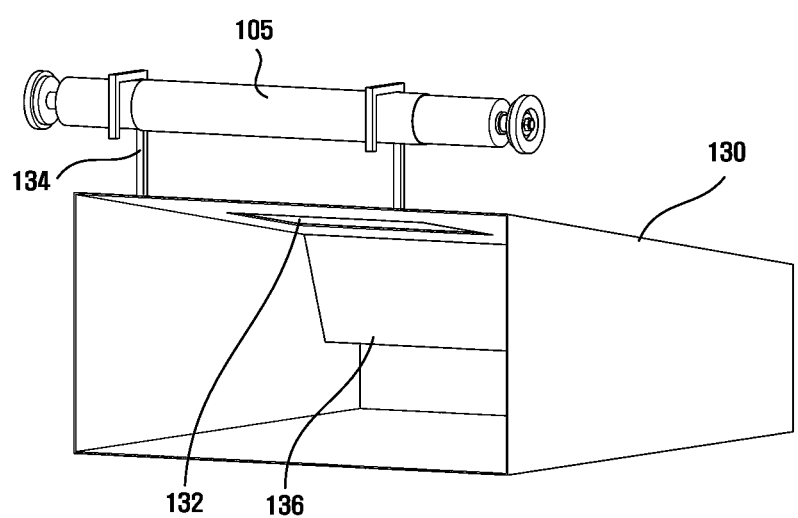
FIG. 7 is a view illustrating a pre-treating unit in the rainwater filtering device of FIG. 1.

FIG. 7 is a view illustrating a screen in the rainwater filtering device of FIG. 1.

Referring to FIGS. 1 and 7, a screen 145 may be supported by a compression rod 105 and may be installed in an inclined state in front of at least one of the filtering unit 110 or the pre-treating unit 130. That is, the screen 145 is installed at a predetermined angle with respect to a flow direction inside the waterway, and filters materials introduced into the filtering unit 110 or the pre-treating unit 130 and larger than a hole of a predetermined size of the screen 145.

The screen 145 may be supported by the compression rod 105 and may be rotated by an external force. For example, the screen 145 may be rotated by a manager who manages the waterway. Pollutants remaining on the screen 145 may be removed by rotating the screen 145. In addition, the precipitate of the pre-treating unit 130 may be more easily removed by rotating the screen 145 so as to minimize interference with an inlet of the pre-treating unit 130.

Figure 8:
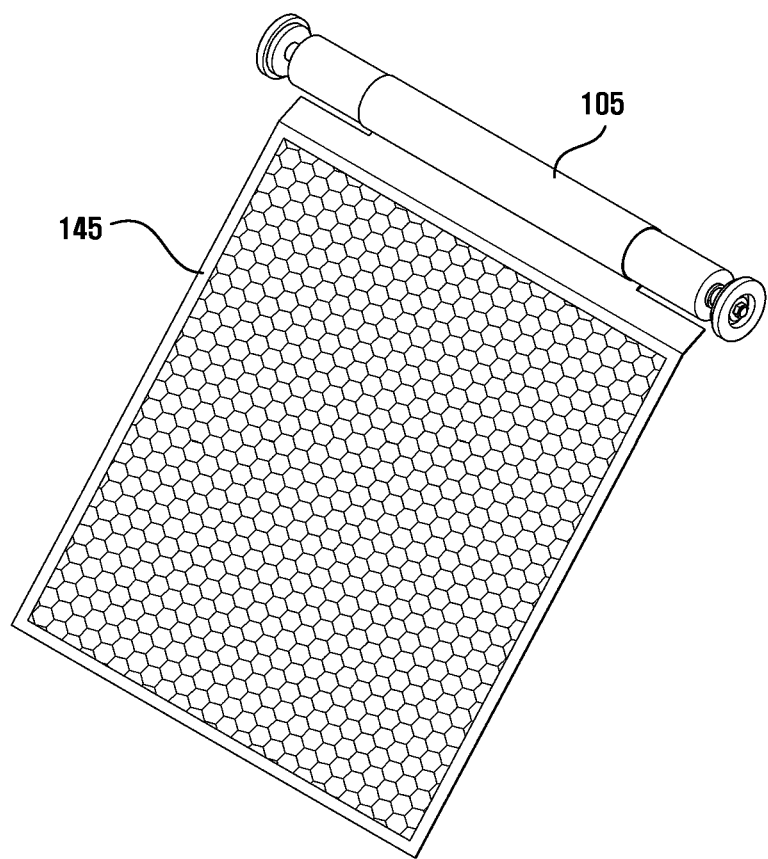
FIG. 8 is a view illustrating a screen in the rainwater filtering device of FIG. 1.

FIG. 8 is a view illustrating an oil adsorption cloth installed in the filtering unit in the rainwater filtering device of FIG. 1.

Referring to FIG. 8, the oil adsorption cloth 118 is installed in the filtering unit 110, and absorbs oil discharged from a vehicle or the like and flowing through the waterway. Specifically, the oil adsorption cloth 118 may be sewed on an upper portion of the strainer or attached to the upper portion of the strainer with Velcro.

Figure 9:
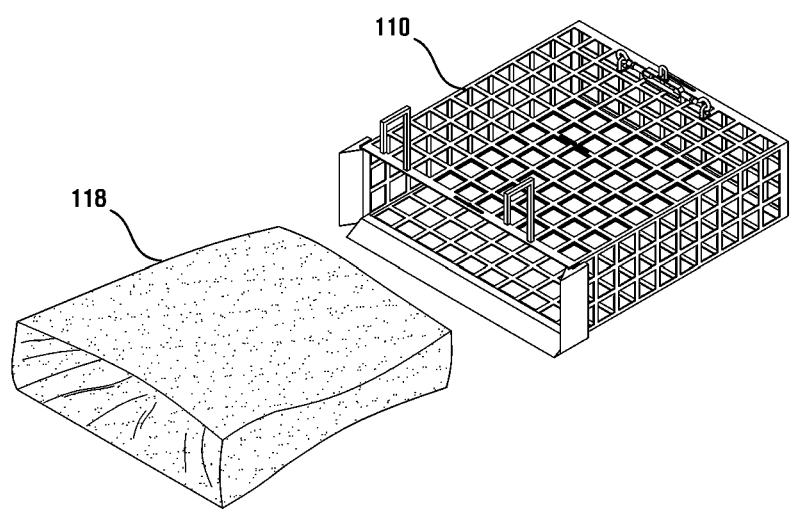
FIG. 9 is a view illustrating an oil adsorption cloth installed in the filtering unit in the rainwater filtering device of FIG. 1.

FIG. 9 is a view illustrating an effective microorganism (EM) supplying unit in the rainwater filtering device of FIG. 1.

Referring to FIG. 9, an EM supply unit 150 is installed above the inlet of the filtering unit 110, and drops an EM capsule 152 or an EM ball having effective microorganisms (EM) toward the inlet of the filtering unit 110. The effective microorganisms (EM) are a microorganisms composite obtained by combining and cultivating microorganisms beneficial to humans and an environment using lactic acid bacteria, photosynthetic bacteria, and a yeast fungus as main bacteria. The effective microorganisms (EM) produce antioxidants, which are fermentation products through a complex coexisting and symbiotic relationship between microbial bacteria, and have excellent effects in removal of odors from water flowing through the waterways, purification of water, and the like.

The effective microorganisms (EM) are applied to the strainer of the filtering unit 110, and may fall periodically regardless of whether or not there is rainfall or may fall periodically at the time of rainfall. Alternatively, the effective microorganisms (EM) may fall periodically in a state of setting an end time according to an amount of rainfall after the rainfall ends. For example, in a case where a rainfall sensor detects the end of the rainfall, the EM supply unit 150 automatically drops the EM capsule 152 or the EM ball on the basis of the amount of rainfall detected by the rainfall sensor. For example, in a case where the amount of rainfall during the day is 100 mm, the EM supply unit 150 may automatically drop the EM capsule 152 every 10 minutes for 24 hours after the rainfall ends.

The EM capsule 152 automatically supplied from the EM supply unit 150 is a water-soluble multiplex capsule, and may have a cylindrical shape. In addition, the EM ball may have a ball shape coated on particles (soils and stones, fillets or the like). In addition, a capsule having another shape, supplied from the EM supply unit 150 may be employed.

Additionally, although not illustrated in the drawings, the storm filter device 100 may include an outer cover in which a locking device is installed, in order to prevent theft of the rainwater filtering device 100 and protect the rainwater filtering device 100 from a physical impact from the outside, or the like.

Figure 10:
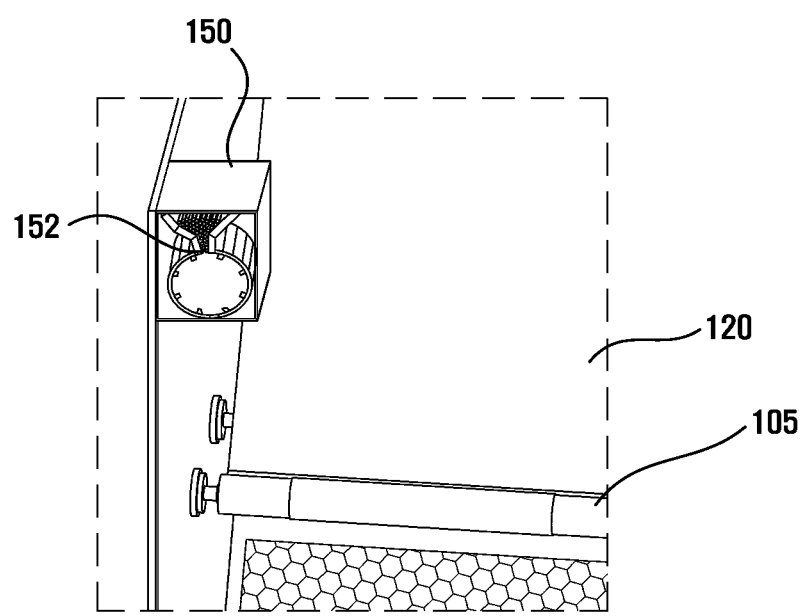
FIG. 10 is a view illustrating an effective microorganism (EM) supplying unit in the rainwater filtering device of FIG. 1.

FIG. 10 is a block diagram illustrating a connection relationship among components of the rainwater filtering device of FIG. 1.

Referring to FIG. 10, the rainwater filtering device 100 may include a sensor unit 160, a communication unit 170, a control unit 180, a power supplying unit 190, and the like.

The sensor unit 160 may include a rainwater amount sensor measuring an amount of rainwater introduced into the filtering unit, a weight sensor measuring a weight of the strainer, a water level sensor measuring a water level of the filtering unit, and a temperature and humidity sensor measuring a temperature and a humidity around the filtering unit.

As illustrated in FIG. 1, the weight sensor 162 may be installed on the compression rod 105 to which the fastening member 114 of the filtering unit 110 is connected, a compression rod 105 to which the connection member 136 of the pre-treating unit 130 is connected, and the like. The weights of the filtering unit 110, the pre-treating unit 130 and the like may be measured by the weight sensor 162.

The rainwater amount sensor (not illustrated) may measure whether or not there is rainfall and the amount of rainwater. The rainwater amount sensor is installed at the inlet through which the rainwater is introduced into the filtering unit 110 to measure whether or not there is rainfall and the amount of introduced rainwater. The rainwater amount sensor may sense rainwater at the beginning of the rainfall or sense a case where the rainfall has ended, and measure the amount of rainwater introduced into the filtering unit 110 for a predetermined time. In addition, the rainwater amount sensor may be installed at the inlet of the pre-treating unit 130 through which the rainwater is introduced to measure whether or not there is rainfall and the amount of rainwater introduced into the pre-treating unit 130.

The water level sensor (not illustrated) may be installed inside the filtering unit 110 or the pre-treating unit 130 to measure an internal water level of the filtering unit 110 or the pre-treating unit 130. In addition, the temperature and humidity sensor (not illustrated) may measure the temperature and the humidity around the filtering unit 110.

The communication unit 170 transmits rainwater amount information, weight information, water level information, temperature information, humidity information, and the like, measured by the sensor unit 160 to the outside. In addition, in a case where it is determined that the filtering unit 110 and/or the pre-treating unit 130 need to be cleaned, the communication unit 170 may transmit information on such a situation to the outside. In addition, data and information transmitted to the communication unit 170 may be stored in an external device, a cloud platform or the like.

In addition, the communication unit 170 may use various wireless Internet or wireless communication networks such as a wireless fidelity (Wi-Fi) manner, 3G, and 4G. For example, the communication unit 170 may use an ultra-low power long-distance mobile communication network such as NB-IoT, LoRa, Wifi, Bluetooth low energy, and LTE-M.

The control unit 180 may control the rainwater filtering device 100 on the basis of the information of the sensor unit 160.

Specifically, the control unit 180 may determine whether or not to clean the filtering unit 110 or the pre-treating unit 130, whether or not to replace the strainer of the filtering unit 110, or the like, on the basis of the amount of rainwater introduced into the filtering unit 110 or the pre-treating unit 130.

For example, in a case where it is determined by the rainwater amount sensor that the rainfall has ended, the control unit 180 may operate the weight sensor 162 to calculate a weight decrease rate of the strainer of the filter unit 110. Here, the weight decrease rate of the strainer refers to a rate at which a weight of the strainer decreases due to evaporation of the rainwater or outflow of the rainwater over time from a point in time when the rainfall has ended. This is to measure a weight of pollutants that are not affected by the rainwater.

Thereafter, the control unit 180 may compare the weight of the strainer with a reference weight value of the strainer in a case where the weight decrease rate of the strainer is within a reference range. Here, the reference range refers to a comparison value capable of detecting a point in time when only pollutants in a dried state remain in the strainer due to the evaporation or the outflow of the rainwater. In addition, the reference weight value is a weight value of pollutants that may be accommodated by the strainer. That is, the reference weight value may correspond to a weight of the pollutants that does not limit a flow of the rainwater and may be accommodated in the strainer.

Thereafter, the control unit 180 may determine whether or not to clean the strainer on the basis of the weight of the strainer. That is, the control unit 180 may determine that the strainer needs to be cleaned in a case where the weight of the strainer exceeds the reference weight value, and determine that the strainer does not need to be cleaned in a case where the weight of the strainer does not exceed the reference weight value.

The control unit 180 may determine whether or not the rainwater filtering device 100 is damaged on the basis of image information of a camera (not illustrated).

Specifically, the control unit 180 may set a region of interest from the image information and derive an event detected in the region of interest. Here, the event is a specific situation that may damage the filtering unit 110 and/or the pre-treating unit 130, and may include introduction of materials that may affect the rainwater filtering device 100, such as coarse adulterations, earthy materials falling on a road pavement, and residues of traffic accidents.

For example, the control unit 180 may detect an object using feature extraction and an extracted feature in order to extract visual feature information of an object to be detected from an input image. In this case, there are a method using a learning machine such as AdaBoost or a Support Vector Machine (SVM) and a non-learning method using a vector similarity between extracted features, at the time of detecting the object, and the learning method and the non-learning method may be appropriately selected and used according to complexities of the object to be detected and a background. For example, a Haar-like feature that uses a difference of the sum of pixel values between two or more adjacent blocks as a local feature of an image or the sum of weight products using weights may be used. In order to obtain the difference of the sum of the pixel values between adjacent blocks at the time of extracting the Haar-like feature, a mask considering the simple square feature is used.

Therefore, the control unit 180 may analyze the image to detect an event that may damage the filtering unit 110 and the pre-treating 130, in addition to the rainwater.

The power supplying unit 190 supplies power to the sensor unit 160, the control unit 180, the communication unit 170, the camera, and the like. The power supplying unit 190 may supply the power using solar heat. For example, the power supplying unit 190 may include a solar power generation element, a storage battery, and the like. The solar power generation element generates power using sunlight, and the storage battery stores the power generated from the solar power generation element.

Such a rainwater filtering device 100 may be not only simply installed and removed, but also may be independently installed even in a site where power or Internet is not connected.

Figure 11:
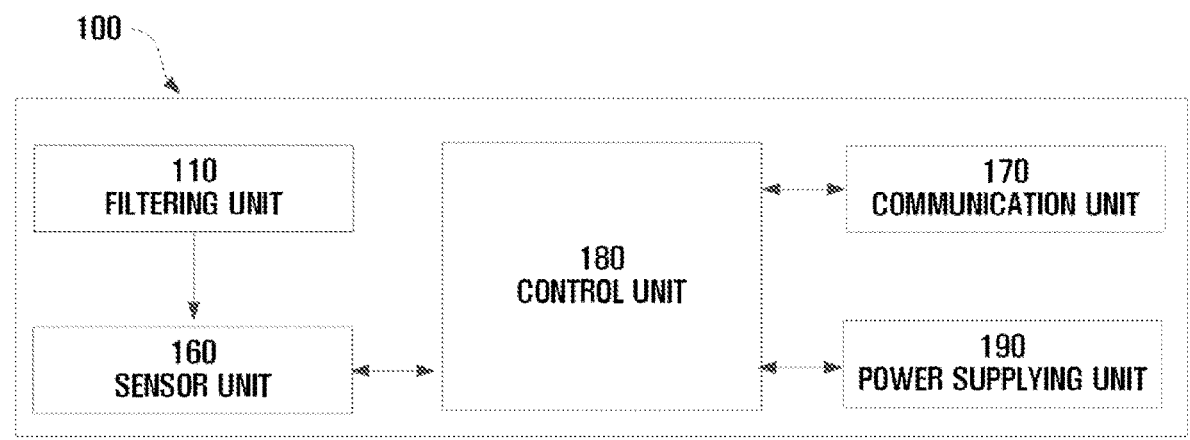
FIG. 11 is a block diagram illustrating a connection relationship among components of the rainwater filtering device of FIG. 1.

FIG. 11 is a block diagram illustrating a connection relationship among components of a monitoring system of the rainwater filtering device of FIG. 1.

Figure 12:
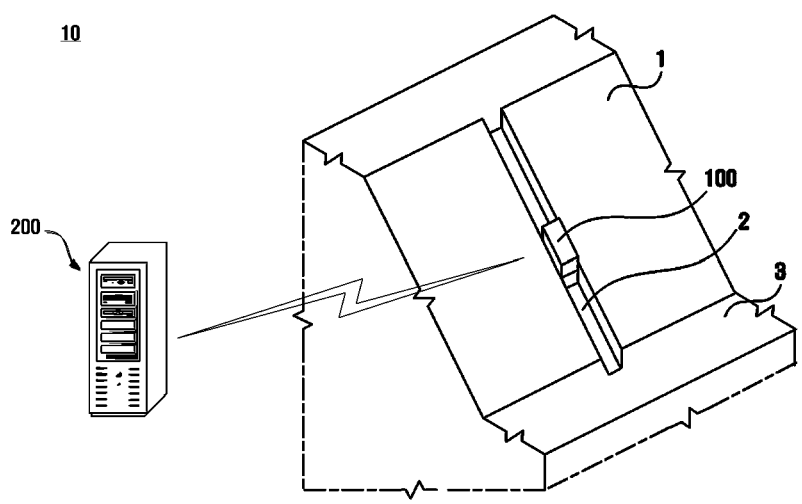
FIG. 12 is a block diagram illustrating a connection relationship among components of a monitoring system of the rainwater filtering device of FIG. 1.

Referring to FIG. 12, the monitoring system 10 of the rainwater filtration device includes the rainwater filtration device 100 and an external control device 200.

Here, the rainwater filtering device 100 may be installed not only in a parallel drainage way of a road, but also a slope 1 of the drainage way. As illustrated in FIG. 12, the rainwater filtering device 100 may be mounted in the middle of the drainage way 2. In addition, the rainwater filtering device 100 may be vertically installed not only in the slope 1 of the road, but also various drainage facilities in which water is vertically drained.

In this case, a detailed configuration of the rainwater filtering device 100 has been described above, and a detailed description therefor will thus be omitted below.

The external control device 200 may determine whether or not to clean the strainer of the filtering unit 110 or whether or not to replace the strainer on the basis of the rainwater amount information, the weight information, the water level information, the temperature information, and the humidity information transmitted from the communication unit 170 of the rainwater filtering unit 110.

As described above, it may be determined by the control unit 180 of the rainwater filtering device 100 whether or not to clean the strainer of the filtering unit 110, whether or not to replace the strainer, or the like. However, the external control device 200 receives the information detected by the sensor unit 160 and the like of the rainwater filtering device 100 through the communication unit 170 and performs determination, such that only sensing and communication functions may be applied to and utilized in an existing underground buried non-point pollution reduction facility.

Because the external control device 200 may receive the rainwater amount information, the weight information, the water level information, the temperature information, and the humidity information, environmental information may be monitored using the rainwater filtering device 100, and the rainwater filtering device 100 may be used as an automatic weather system (AWS). To this end, the external control device 200 may include a communication module (not illustrated) capable of communicating with the rainwater filtering device 100, a determining module (not illustrated) determining whether or not to clean the strainer of the filtering unit 110, whether or not to replace the strainer, or the like, a storage module (not illustrated) storing information transmitted from the communication module and information determined by the determining module, and the like.

In addition, in a case where external control device 200 determines whether or not to clean the strainer of the filtering unit 110 or whether or not to replace the strainer, the external control device 200 may generate a cleaning necessary alarm and notify a manager of the cleaning necessary alarm. To this end, the external control device 200 may include a display displaying visual information, a speaker generating a warning sound, a light emitting device notifying the manager of a warning with light, and the like.

Although exemplary embodiments of the present invention have been described with reference to the accompanying drawings, those skilled in the art will appreciate that various modifications and alterations may be made without departing from the spirit or essential feature of the present invention. Therefore, it is to be understood that the exemplary embodiments described above are illustrative rather than being restrictive in all aspects.

DRAWINGS

[FIG. 10]
110 FILTERING UNIT
160 SENSOR UNIT
170 COMMUNICATION UNIT
180 CONTROL UNIT
190 POWER SUPPLYING UNIT

The invention claimed is:

1. A rainwater filtering device comprising: a filtering unit including a strainer therein; a first overflow preventing unit supported by a first compression rod and installed above the filtering unit; a pre-treating unit installed in front of an inlet of the filtering unit in order to pre-treat rainwater introduced into the filtering unit; and a second overflow preventing unit supported by a second compression rod and installed above the pre-treating unit, wherein the filtering unit includes: a connection ring hooked onto a third compression rod to support one end of the filtering unit; a connection member connected to a fourth compression rod supporting the first overflow preventing unit to support the other end of the filtering unit; and a guide fixing plate including a lower fixing plate and a pair of side fixing plates installed at the inlet of the filtering unit to fix the strainer.

2. The rainwater filtering device of claim 1, wherein a weight sensor is installed on the fourth compression rod to which the connection member is connected.

3. The rainwater filtering device of claim 1, wherein the lower fixing plate is in close contact with a bottom of a waterway, and includes a double groove whose thicknesses are different from each other so that one end of the strainer is overturned and inserted, so as to correspond to a thickness of the strainer.

4. The rainwater filtering device of claim 1, wherein the pair of side fixing plates are in close contact with a vertical preventing plate of the first overflow preventing unit.

5. The rainwater filtering device of claim 1, wherein the pre-treating unit includes: an upper opening; a connection ring hooked onto a fifth compression rod to support one end of the pre-treating unit; and a connection member connected to a sixth compression rod to support the other end of the pre-treating unit; and an inclined plate inclined and attached to an upper portion and located behind the upper opening.

6. The rainwater filtering device of claim 5, wherein a weight sensor is installed on the sixth compression rod to which the connection member is connected.

7. The rainwater filtering device of claim 1, further comprising a screen supported by the fifth compression rod and installed in an inclined state in front of at least one of the filtering unit or the pre-treating unit.

8. The rainwater filtering device of claim 1, further comprising an EM supply unit installed above the inlet of the filtering unit and drops an EM capsule or an EM ball having effective microorganisms (EM) toward the inlet of the filtering unit.

9. The rainwater filtering device of claim 1, further comprising a sensor unit including a rainwater amount sensor measuring an amount of rainwater introduced into the filtering unit, a weight sensor measuring a weight of the strainer, a water level sensor measuring a water level of the filtering unit, and a temperature and humidity sensor measuring a temperature and a humidity around the filtering unit.

10. The rainwater filtering device of claim 9, further comprising a communication unit transmitting rainwater amount information, weight information, water level information, temperature information, and humidity information measured by the sensor unit to the outside.

11. A monitoring system of a rainwater filtering device, comprising:

the rainwater filtering device of claim 10; and a remote control device determining whether or not to clean the strainer or whether or not to replace the strainer on the basis of the rainwater amount information, the weight information, the water level information, the temperature information, and the humidity information transmitted from the communication unit of the rainwater filtering device.

* * * * *